(12) United States Patent
Speer

(10) Patent No.: US 7,833,602 B1
(45) Date of Patent: Nov. 16, 2010

(54) VEHICLE FLOOR MAT

(76) Inventor: William C. Speer, 122 Route 284, Sussex, NJ (US) 07461

( * ) Notice: Subject to any disclaimer, the term of this patent is extended or adjusted under 35 U.S.C. 154(b) by 422 days.

(21) Appl. No.: 12/018,958

(22) Filed: Jan. 24, 2008

(51) Int. Cl.
*B32B 3/10* (2006.01)
*B60N 3/04* (2006.01)
(52) U.S. Cl. .................. 428/54; 296/97.23; 237/77
(58) Field of Classification Search .............. 428/12, 428/54; 15/215; 52/177, 180; 296/97.23; 238/14; 237/77; 404/35–37
See application file for complete search history.

(56) References Cited

U.S. PATENT DOCUMENTS

| 118,952 | A | * | 9/1871 | Lewis | 52/663 |
| 3,595,140 | A | * | 7/1971 | Lundin | 404/35 |
| 3,913,291 | A | * | 10/1975 | Dulien et al. | 52/396.04 |

* cited by examiner

*Primary Examiner*—Alexander Thomas

(57) ABSTRACT

A vehicular floor mat constructed of a plurality of hollow tubes, at least two spaced-apart through holes along a length of the hollow tubes for receiving at least two threaded rods, a plurality of tubular spacers positioned inbetween two adjacent hollow rods for maintaining a predetermined distance between the hollow tubes, and a nut engaging the ends of the threaded rods to hold the hollow tubes together forming a floor mat.

6 Claims, 4 Drawing Sheets

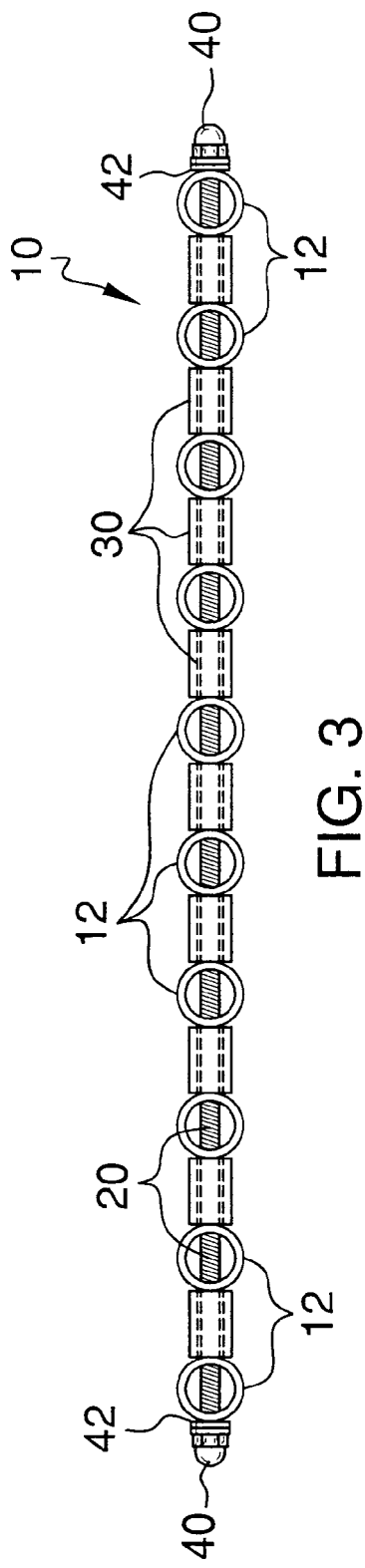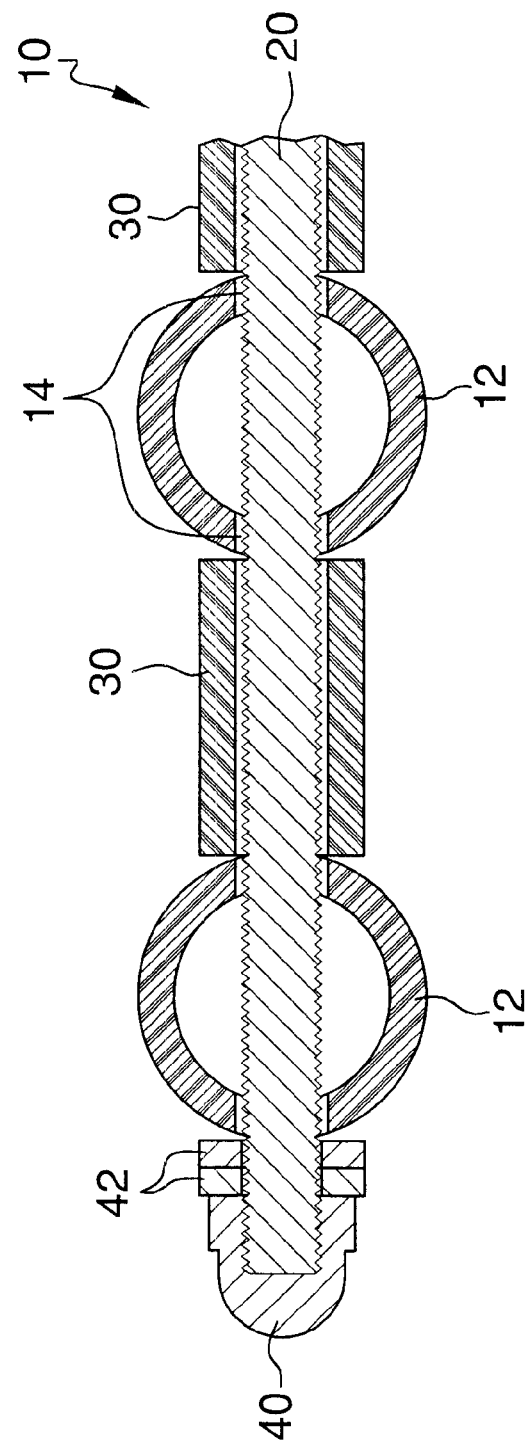

VEHICLE FLOOR MAT

FIELD OF THE INVENTION

The present invention generally relates to a vehicular accessory and more particularly, relates to a vehicular floor mat that is formed by hollow tubes.

BACKGROUND OF THE INVENTION

Long distance driver's for vehicles, and particularly for commercial trucks frequently suffer the effect of a cold floor when driving in a cold climate or the effect of a hot floor when driving in a warm climate. Since the feet of the driver are positioned flat against the floor of the driver's cab, such uncomfortable occurrences not only cannot be avoided but also can cause serious problems for the driver's feet after an extended length of driving time. It is therefore desirable to provide a floor mat that can keep the driver's feet warm during a cold climate, and keep the driver's feet cool during a warn climate.

It is therefore an object of the present invention to provide a vehicular floor mat that does not have the drawbacks or shortcomings of the convention floor mats.

It is another object of the present invention to provide a vehicular floor mat that is formed by hollow tubes that are spaced-apart to allow air circulation between the hollow tubes.

SUMMARY OF THE INVENTION

In accordance with the present invention, a vehicular floor mat that is formed by hollow tubes is provided.

A preferred embodiment of the present invention floor mat can be constructed of a plurality of hollow tubes each having an outside diameter of at least ½ inch; at least two spaced-apart through holes along a length of each of the plurality of hollow tubes adapted for receiving at least two threaded rods therethrough; a plurality of tubular spacers with two each positioned inbetween two of the plurality of hollow tubes for the two threaded rods to pass therethrough and for maintaining a predetermined distance between the two hollow tubes; and a nut engaging each end of the threaded rod such that the plurality of hollow tubes are held together forming a floor mat.

BRIEF DESCRIPTION OF THE DRAWINGS

The invention will now be described, by way of example, with reference to the accompanying drawings, in which:

FIG. 3 is a side view of the present invention floor mat.

FIG. 4 is a partial, enlarged cross-sectional view of the present invention floor mat.

DETAILED DESCRIPTION OF THE PREFERRED EMBODIMENT

The present invention discloses a floor mat that can be used in a vehicle that is especially suitable for long distance driving.

The present invention vehicular floor mat is a specially designed floor mat used for keeping a truck driver's feet warm when traveling in cold winter weather. It insolates the driver's feet from the cold floor for added comfort while traveling. It can also be used in hot summer weather to keep feet off a hot floor. The present invention floor mat measures about 1 inch thick, 20 inches long, and about 19 inches wide. It is constructed primarily of plastic tubing, threaded rods, washers, and acorn nuts. The series of resilient plastic tubes extend laterally to form the main body of the portable mat. The two spaced-threaded rods are positioned perpendicular to secure the tubing together. The closely spaced inflatable tubes create a cushion of air upon which the professional truck driver could rest both feet while traveling down the highway. This elevates the feet above the ice-cold floorboard in the winter so the truck driver's feet remain warm and comfortable. In hot summer weather, the present invention floor mat can be used to elevate the feet of the hot floor.

The present invention vehicle floor mat fulfills the need for protection against cold feet. The appealing features of the floor mat are its ease of use, its comfort afforded the user. Instead of a truck driver suffering from cold feet while traveling in freezing winter weather conditions, the present invention floor mat keeps an elevated and insolated. It further helps to prevent the distraction, discomfort, and possible numbing of the feet while traveling, thereby making travel more enjoyable for the professional truck driver. The present invention floor mat further enables a truck driver to be better able to respond with quick breaking action in the event of an emergency, thereby enhancing travel safety. The floor mat can be lightweight, affordable and portable for an ease transfer between different trucks.

Figure 1:
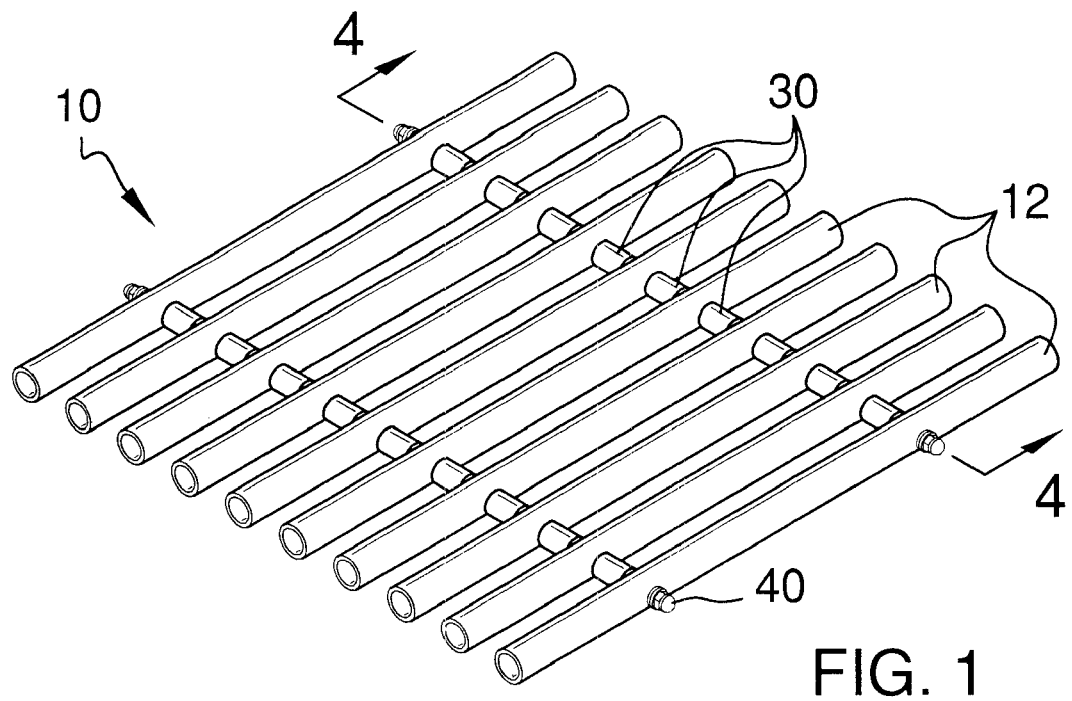
FIG. 1 is a perspective view of the present invention floor mat formed by hollow tubes.
Figure 2:
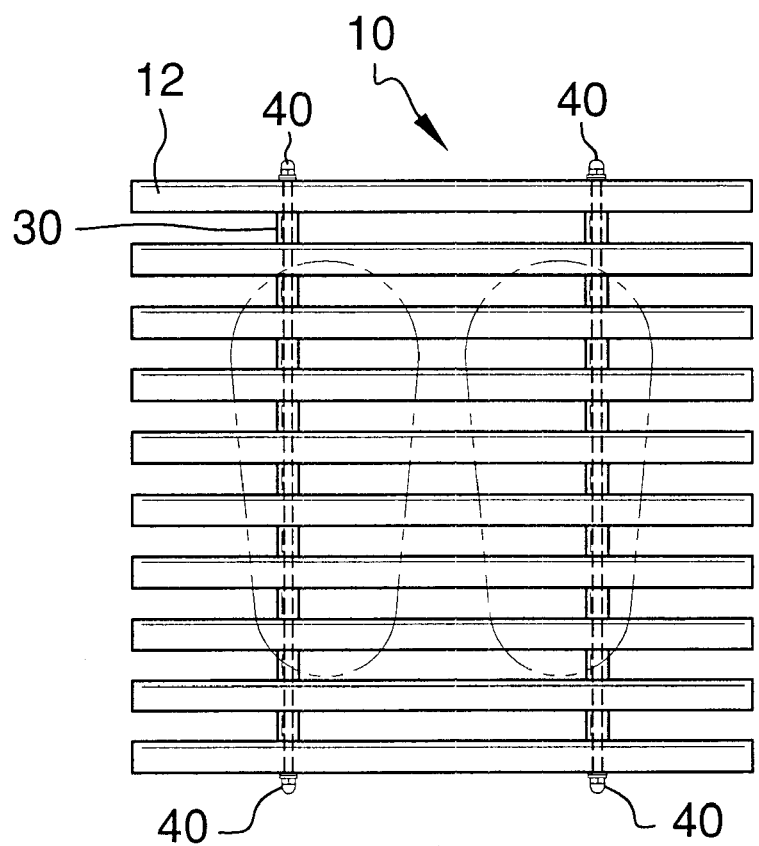
FIG. 2 is a top view of the present invention floor mat formed by hollow tubes.

Referring initially to FIG. 1, wherein a perspective view of a present invention vehicular floor mat 10 is shown. The floor mat 10 is constructed of a plurality of hollow tubes 12 each has an outside diameter of at least ½ inch, and preferable of about 1 inch. At least two spaced-apart through holes 14, also shown in FIGS. 2-5, are provided along a length of each of the plurality of hollow tubes 12 adapted for receiving at least two threaded rods 20 therethrough. The plurality of hollow tubes 12 may be formed of a polymeric material, or a pliable plastic material.

Figure 5:
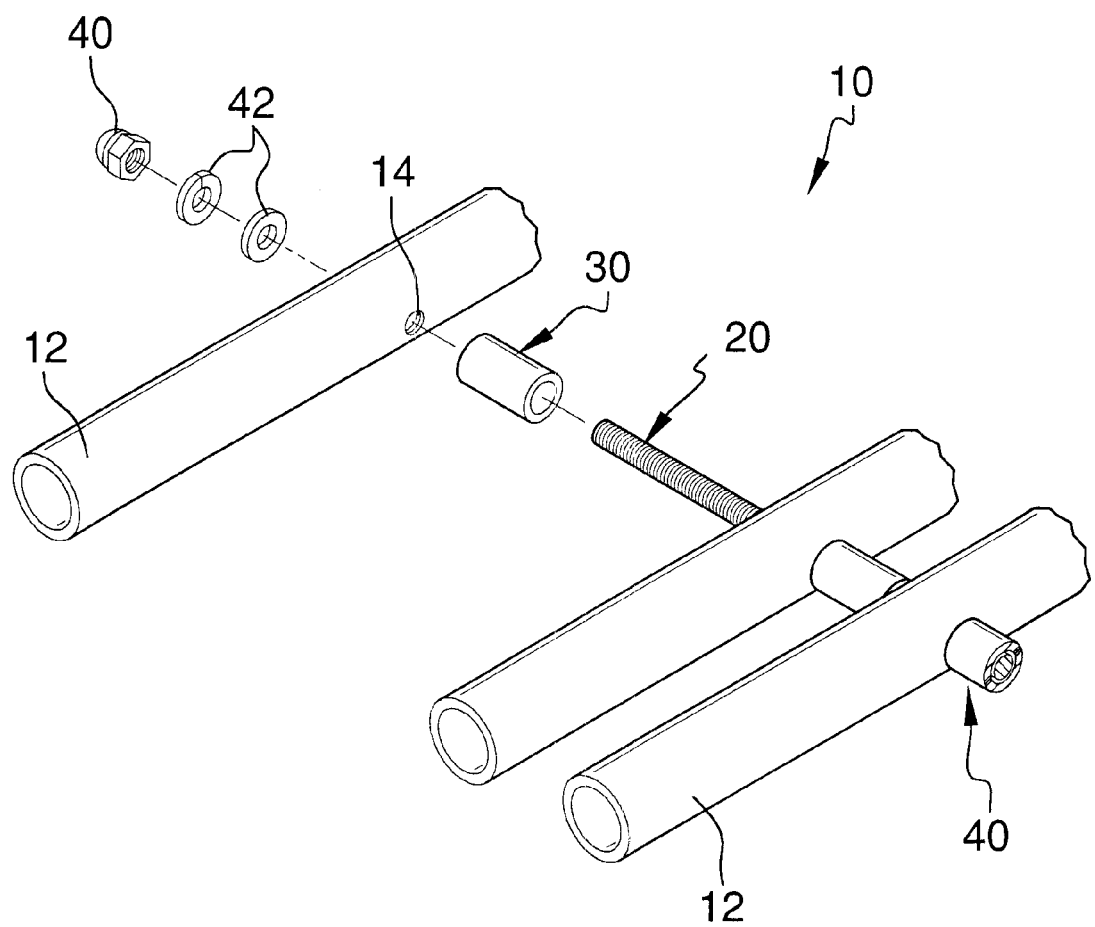
FIG. 5 is a partial, perspective view illustrating the various components of the present invention floor mat.

A plurality of tubular spacers 30 with two each positioned inbetween two of the plurality of hollow tubes 12 for the two threaded rods 20 to pass therethrough and for maintaining a predetermined distance between the two adjacent hollow tubes 12. This is best shown in FIG. 5. The length of a typical spacer 30 may be between about ½ inch and about 1.5 inch for providing a suitable floor mat. A nut 40 and at least one washer 42 are used for engaging each end of the threaded rod 20 such that the plurality of tubes 12 are held securely together. A suitable type of nut 40 may be of the acorn type, as shown in FIG. 5. In one embodiment, the two threaded rods are threaded at two free ends only.

Figure 6:
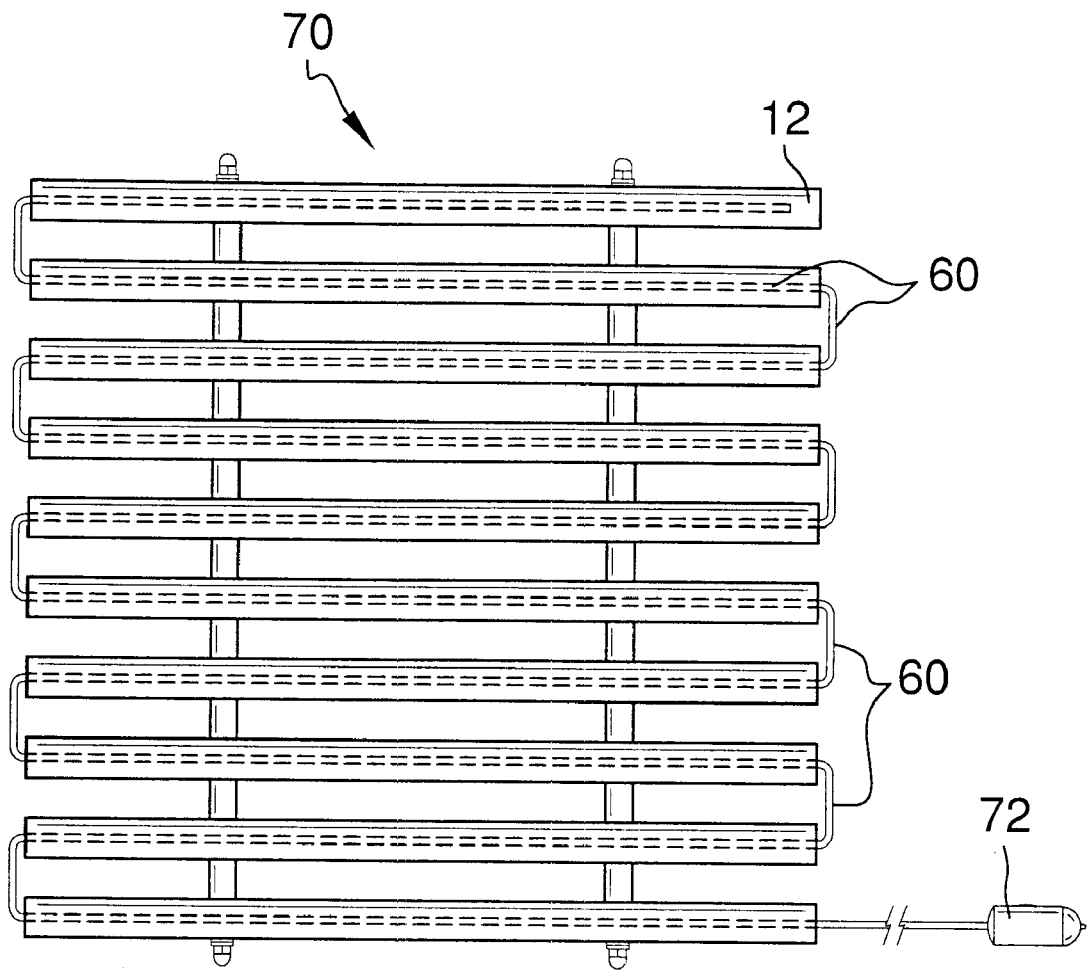
FIG. 6 is a top view of an alternate embodiment of the present invention floor mat.

In an alternate embodiment of the present invention, as shown in FIG. 6, a heating element 60 may be threaded through the hollow tubes 12 for providing warmth during winter driving. The heated floor mat 70 is further provided with an electrical plug 72 for plugging into a cigarette lighter socket (not shown) in the vehicle.

The present invention vehicular floor mat has therefore been amply described in the above descriptions and in the appended drawings of FIGS. 1-6.

While the preferred embodiments of the invention have been described above, it will be recognized and understood that various modifications can be made in the invention and the appended claims are intended to cover all such modifications which may fall within the spirit and scope of the invention.

What is claimed is:

1. A floor mat comprising:

a plurality of hollow tubes each having an outside diameter of at least ½ inch;

at least two spaced-apart throughholes along a length of each of said plurality of hollow tubes receiving at least two threaded rods therethrough;

a plurality of tubular-shaped spacers with two each positioned inbetween two adjacent ones of said plurality of hollow tubes for said two threaded rods to pass therethrough and for maintaining a predetermined distance between said two hollow tubes;

a nut engaging each end of said threaded rod such that said plurality of hollow tubes are held together forming a floor mat; and a heating element installed inside said plurality of hollow tubes for emitting heat.

2. The floor mat according to claim 1, wherein said plurality of hollow tubes is formed of a polymeric material.

3. The floor mat according to claim 1, wherein said plurality of hollow tubes is formed of a pliable plastic material.

4. The floor mat according to claim 1, wherein said at least two threaded rods are threaded at two free ends only.

5. The floor mat according to claim 1, wherein said plurality of tubular spacers each having a length of at least ½ inch.

6. The floor mat according to claim 1, wherein said nut is an acorn nut.

* * * * *